Patented June 13, 1933

1,913,383

UNITED STATES PATENT OFFICE

IVAN GUBELMANN, OF SOUTH MILWAUKEE, AND ARTHUR R. MURPHY, OF MILWAUKEE, WISCONSIN, ASSIGNORS, BY MESNE ASSIGNMENTS, TO E. I. DU PONT DE NEMOURS & COMPANY, A CORPORATION OF DELAWARE

AZO DYESTUFF AND PROCESS OF PREPARING THE SAME

No Drawing.   Application filed December 22, 1930.   Serial No. 504,211.

This invention relates to a process of preparing a novel type of azo dyestuffs which is characterized by containing the terephthaloyl residue.

More particularly, it is an object of this invention to devise a process for preparing polyazo dyes of the following probable general formula:

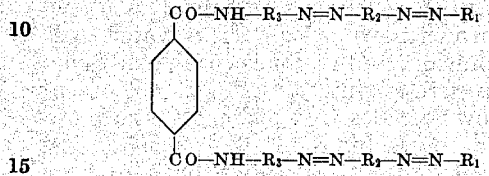

in which $R_1$, $R_2$, and $R_3$ stand for aromatic residues or groups and in which $R_1$ may or may not contain further azo groups.

Dyestuffs of the above type are characterized by exceptional fastness to light and to washing. Our process is therefore exceptionally valuable because it leads to a series of commercially valuable dyestuffs useful for dyeing cotton, wool, silk, rayon, etc.

Our process is particularly useful for the preparation of dyestuffs of the above general formula which have no free OH or $NH_2$ groups in the $R_3$ residue since these dyestuffs cannot be prepared by the method described in Example 4 of British Patent No. 326,791. This disclosure, to the best of our knowledge, is the only publication to this date dealing with the preparation of dyestuffs of this general type. Consequently, our novel method leads to a new series of dyestuffs, hitherto not known, and not obtainable by the hitherto known methods.

As a special branch of our novel series of dyestuffs may be mentioned the group in which $R_1$, $R_2$ and $R_3$ stand for aromatic residues of the benzene or naphthalene series, which may be further substituted by alkyl, alkoxy, halogen, sulfonic acid or similar groups, but which do not contain any free hydroxyl or amino groups. This particular group of dyestuffs is characterized by giving orange to brown shades of good brilliancy and excellent fastness to light and to washing.

Our novel process in general consists of condensing two moles of an amino polyazo dyestuff of the type $$H_2N-R_3-N=N-R_2-N=N-R_1$$

(in which $R_1$ may be an aryl residue or two or more aryl bodies linked together by $-N=N-$ groups) with one mole of a terephthaloyl halide or a homologue or derivative thereof, in the presence of a suitable condensing agent such as sodium hydroxide, sodium carbonate, sodium acetate, or other substance capable of neutralizing HCl or HBr.

Obviously, instead of starting with a single amino-polyazo compound of the type $H_2N-R_3-N=N-R_2-N=N-R_1$ one may use two different amino-polyazo compounds obtaining thereby a dyestuff which contains at least in part an unsymmetrical compound of the type:

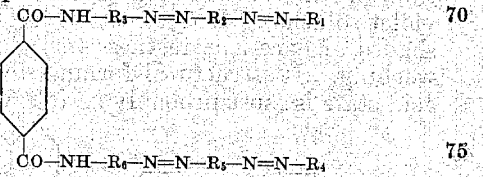

As stated above $R_1$ $R_2$ and $R_3$ (or $R_4$, $R_5$ and $R_6$) are aromatic residues and may be substituted by any desirable substituents, such as, for example, alkyl, alkoxy and halogen. To impart water-solubility thereto, the entire dyestuff should contain at least two sulfonic acid groups. In the case where $R_1$, $R_2$ and $R_3$ (and $R_4$, $R_5$ and $R_6$) are so chosen that the final dyestuff contains no free hydroxyl or amino group, orange to brown shades may be obtained.

The following examples will further illustrate our invention, but it should be understood that our invention is not limited to these. The Parts given are parts by weight.

Example 1

325 parts of 2-naphthylamine-6,8-disulfonic-acid- monosodium salt, are dissolved in 2,000 parts of water and diazotized in the usual manner at about 5° C. by means of 348 parts of 20° Bé. hydrochloric acid and 69 parts of sodium nitrite. 350 parts of sodium acetate (crystals) and 209 parts of methyl-aniline-omega-sulfonic acid (sodium salt) are added, and the mass stirred for about 15 hours. The coupling product is now salted out, filtered, and boiled in 10% caustic soda to hydrolize off the methyl-sulfonic acid group. After neutralizing the excess caustic soda, the amino-azo compound is salted out, isolated by filtration, dissolved in 5,000 parts of water, and diazotized in the usual manner, at about 15° C., by the addition of about 52 parts of sodium nitrite (or an amount just sufficient to effect diazotization) and 290 parts of 20° Bé. hydrochloric acid. After stirring for 3 hours the diazotization is complete. 96 parts of meta-toluidine, dissolved in 1,000 parts of water and 104 parts of 20° Bé. hydrochloric acid, are now added, and the coupling is completed by the gradual addition of 210 parts of sodium acetate (crystals). The mass is now stirred for 12 hours, acidified with 232 parts of 20° Bé. hydrochloric acid, heated to 60° C., salted out and isolated by filtration. The amino-disazo dyestuff is now dissolved in 10,000 parts of water containing 40 parts of caustic soda and heated to 70° C. 106 parts of soda ash and 100 parts of terephthaloyl chloride are now added over a period of about ½ hour. The mass is stirred for another 2 hours at about 72 to 78° C., and the dyestuff salted out and filtered. The resultant product is an orange powder, soluble in water to an orange solution and in concentrated sulfuric acid to a violet solution. It dyes cotton light orange shades of excellent fastness to light and to washing. Its structural formula in the free acid state is most probably as follows:

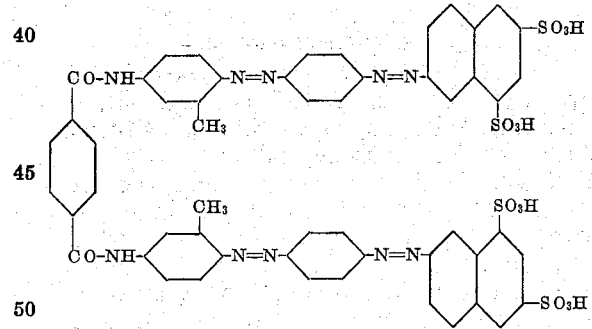

*Example 2*

173 parts of sulphanilic acid (aniline-p-sulfonic acid) are dissolved in 4,000 parts of water and 40 parts of caustic soda and cooled to 5° C.; 69 parts sodium nitrate are next added and diazotization is effected, while stirring, by the rapid addition of 348 parts of 20° Bé. hydrochloric acid. After stirring about ½ hour, a solution of 245 parts of the sodium salt of 1,7-Cleve's acid (the 1,6-Cleve's acid may be used instead) dissolved in 3,000 parts water is added and the coupling completed by stirring for 12 hours. The monoazo compound thus formed is converted into the sodium salt by the addition of 40 parts of caustic soda. 76 parts of sodium nitrite are now added, the solution agitated, and 580 parts of 20° Bé. hydrochloric acid are introduced. After stirring for 4 hours the sparingly soluble diazo compound is salted out, filtered off, and pasted in 6,000 parts of ice and water. A solution of 107 parts of meta-toluidine dissolved in 1,000 parts of water and 116 parts of 20° Bé. hydrochloric acid is now added. The coupling is completed by the gradual addition, while stirring, of 140 parts of sodium acetate (crystals) dissolved in 1,000 parts of water. The disazo dyestuff formed is isolated by the addition of 290 parts of 20° Bé. hydrochloric acid, salting and filtering. The isolated disazo dyestuff is dissolved in 10,000 parts of hot water (about 75° C.) and 40 parts of caustic soda. 106 parts of soda ash and 100 parts of terephthaloyl chloride are now added. The reaction solution is stirred for 2 hours at 72 to 78° C. and the dyestuff isolated by salting and filtering. The resulting dyestuff is a light brown powder, soluble in water to a brown solution, and in concentrated sulfuric acid to a green solution. It dyes cotton in light brown shades of excellent fastness to light and to washing. In the form of its free acid it has most probably the following formula:

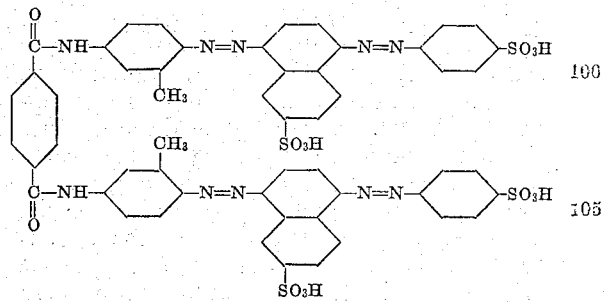

*Example 3*

569 parts (1 mole) of the disodium salt of the aminodisazo dyestuff prepared according to Example 1 and having the following probable formula:

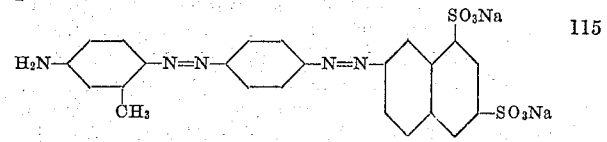

and 569 parts (1 mole) of the disodium salt of the amino-disazo dyestuff prepared according to Example 2, and having the following probable formula:

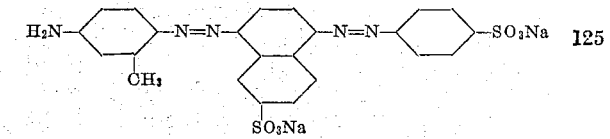

are dissolved together in 20,000 parts of water; 212 parts of soda ash are introduced and 203 parts (1 mole) of terephthaloyl chloride are added. The mixture is stirred for two hours at 72 to 78° C., and the condensation product isolated by salting out and filtering. The resulting dyestuff dyes cotton in light brown shades. It dissolves in water to give a brown solution, and in concentrated sulfuric acid with a blue color.

The dyestuff is probably a mixture of the two symmetrical dyestuffs obtained respectively in Examples 1 and 2, and a third, unsymmetrical dyestuff having in the form of its free acid most probably the following formula:

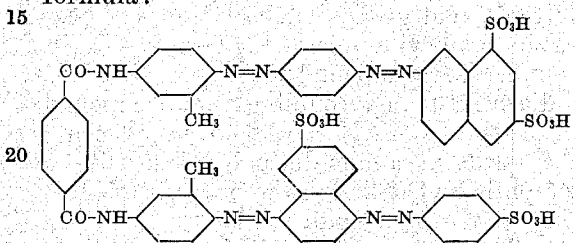

If desired, the relative proportions of these individual polyazo dyestuffs in the mixture may be varied by starting with unequal quantities of the original disazo dyestuffs, provided a total of two moles of these disazo dyestuffs is condensed with 1 mole (more or less) of terephthaloyl chloride. Intermediate shades may thus be obtained ranging from orange to brown.

In a similar manner trisazo dyestuffs may be used as starting materials to give various symmetrical or unsymmetrical condensation products. Similarly, mixtures of trisazo and disazo dyestuffs may be used as initial materials. As an example of a trisazo dyestuffs particularly useful for the above purpose, the one having the following formula in the form of its free acid may be mentioned:

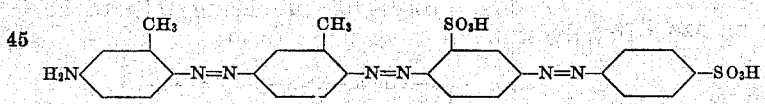

which may be prepared by diazotizing amino-azo-benzene-disulfonic acid, coupling to meta-toluidine, rediazotizing and coupling again to meta-toluidine.

While we have indicated the use of the two moles of amino-disazo compound to substantially one mole of terephthaloyl halide in the examples, it is to be understood that this proportion need not be adhered to precisely. On the contrary, the reaction may be facilitated by the use of an excess of terephthaloyl body, which excess decomposes during the prolonged stirring of the condensation mass into soluble compounds, which are separated from the precipitated dyestuff during the filtration step. On the other hand, excesses of the amino-polyazo bodies may be used; and although these will precipitate with the dyestuff, the latter may be separated therefrom by repeated purification steps, such as by re-solution and salting out.

The term auxochromic groups is used in its regular sense in the claims to mean OH and $NH_2$ groups.

The process may be varied through a wide range without departing from the principles of this invention; thus, for example, a halogen substituted terephthaloyl halide such as a chloro-terephthaloyl-chloride may be used in place of the terephthaloyl halides in the above examples.

In the claims below, it should be understood that where new products, dyestuffs, or articles of manufactures are claimed, we mean to include those bodies not only in substance, but also in whatever state they exist when applied to materials dyed, printed, or pigmented therewith.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing a polyazo dyestuff containing a terephthaloyl group, which comprises condensing amino-polyazo compounds with a terephthaloyl halide which may be halogen substituted in the benzene nucleus.

2. The process of preparing a polyazo dyestuff containing a terephthaloyl group, which comprises condensing amino-polyazo compounds with a terephthaloyl halide substantially in the ratio of 2:1 moles.

3. The process of preparing an azo dyestuff of the type:

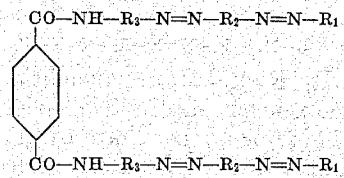

which comprises condensing two moles of an amino azo compound of the type:

$$H_2N-R_3-N=N-R_2-N=N-R_1,$$

in which $R_1$, $R_2$ and $R_3$ are aromatic residues of the benzene or naphthalene series and in which $R_1$ may be an azo chain of aryl bodies of the benzene or naphthalene series linked together by $-N=N-$ groups, with substantially one mole of a terephthaloyl halide, in the presence of a condensing agent.

4. The process of preparing an azo dyestuff of the type:

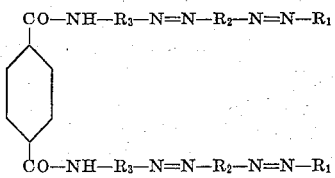

which comprises condensing an azo-amino compound of the type:
$$H_2N-R_3-N=N-R_2-N=N-R_1$$
in which $R_1$, $R_2$ and $R_3$ are aromatic residues of the benzene or naphthalene series and in which $R_1$ may be an azo chain of aryl bodies of the benzene or naphthalene series linked together by —N=N— groups, with a terephthaloyl halide, in the presence of a condensing agent.

5. The process of preparing an azo dyestuff of the type:

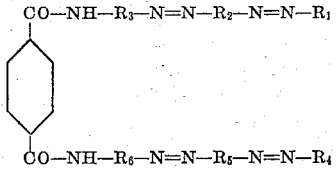

which comprises condensing with a terephthaloyl halide in the presence of a condensing agent two different amino-azo compounds of the type:
$$H_2N-R_3-N=N-R_2-N=N-R_1$$
and
$$H_2N-R_6-N=N-R_5-N=N-R_4$$
in which $R_1$, $R_2$, $R_3$, $R_4$, $R_5$ and $R_6$ are aromatic residues of the benzene or naphthalene series and in which $R_1$ and $R_4$ may be azo chains or aryl bodies of the benzene or naphthalene series linked together by —N=N— groups.

6. The process of preparing an azo dyestuff of the type:

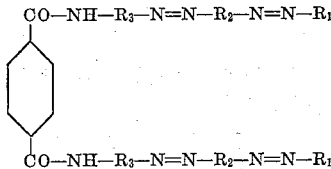

in which $R_1$, $R_2$ and $R_3$ are aromatic residues of the benzene or napthalene series and in which $R_1$ may be an azo chain of aryl bodies of the benzene or naphthalene series linked together by —N=N— groups, which comprises diazotizing a compound of the type: $R_1$—N=N—$R_2$—$NH_2$, coupling to a compound of the type: $R_3$—$NH_2$ and condensing the resulting amino-polyazo compound substantially in the ratio two moles to one mole with a terephthaloyl halide, in the presence of a condensing agent.

7. The process of preparing a tetrakisazo dyestuff of the type:

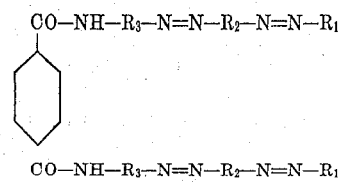

in which $R_1$, $R_2$ and $R_3$ stand for the same or different aromatic residues of the benzene or naphthalene series which may be further substituted with alkyl, alkoxy, halogen or sulfonic acid groups which comprises diazotizing an aryl amine of the type $R_1$—$NH_2$, coupling to a compound of the type $R_2$—$NH_2$, rediazotizing and coupling to a compound of the type $R_3$—$NH_2$, and finally condensing the resultant amino-diazo dyestuff with a terephthaloyl halide in the presence of alkaline condensing agents.

8. The process of preparing tetrakisazo dyestuffs of the general formula:

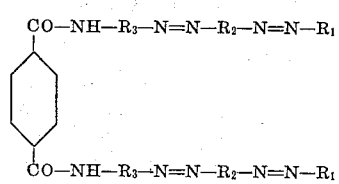

in which $R_1$, $R_2$ and $R_3$ stand for the same or different aromatic residues of the benzene or naphthalene series, but in which $R_3$ contains no free OH or $NH_2$ groups, which comprises condensing 2 moles of an amino-disazo compound of the type
$$R_1-N=N-R_2-N=N-R_3,$$
with substantially one mole of a terephthaloyl halide in the presence of alkaline condensing agents.

9. The process of preparing tetrakisazo dyestuffs of the general formula:

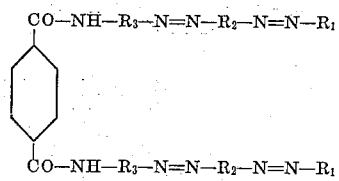

in which $R_1$, $R_2$ and $R_3$ stand for the same or different aromatic residues of the benzene or naphthalene series, but in which $R_3$ contains no free OH or $NH_2$ groups, which comprises diazotizing an amino-azo compound of the type $R_1-N=N-R_2-NH_2$, coupling with a compound of the type $R_3-NH_2$, and condensing the resulting amino-disazo compound substantially in the ratio 2:1 moles with a terephthaloyl halide in the presence of alkaline condensing agents.

10. The process of preparing tetrakisazo dystuffs of the general formula:

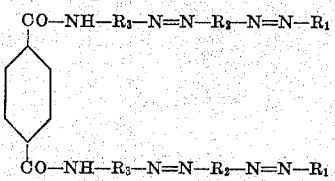

in which $R_1$, $R_2$ and $R_3$ stand for the same or different aromatic residues of the benzene or naphthalene series but in which $R_3$ contains no free OH or $NH_2$ groups, which comprises diazotizing an aryl amine of the type $R_1-NH_2$, coupling to an arylamine of the type $R_2-NH_2$, rediazotizing and coupling to an aryl amine of the type $R_3-NH_2$, and finally condensing the resulting amino-disazo dyestuff, substantially in the ratio 2:1 moles, with terephthaloyl chloride, in the presence of alkaline condensing agents.

11. The process of preparing orange to brown azo dyestuffs characterized by great fastness to light which comprises, condensing a secondary disazo dyestuff of the general type: $R_1-N=N-R_2-N=N-R_3-NH_2$ in which $R_1$, $R_2$ and $R_3$ are the same or different aromatic residues of the benzene or naphthalene series containing no OH or $NH_2$ groups, with a terephthaloyl halide in the presence of alkaline condensing agents.

12. The process of preparing orange to brown azo dyestuffs, fast to light and to washing, which comprises diazotizing an amino compound of the type: $[R_1-N=N-R_2-NH_2]-(SO_3H)_x$ and coupling to a compound of the type $R_3-NH_2$ in which formulæ $R_1$, $R_2$ and $R_3$ are the same or different aromatic residues of the benzene or naphthalene series containing no OH or $NH_2$ groups and in which $x$ is an integer not greater than 3, and condensing the resulting amino-disazo compound substantially in the molal ratio 2:1 with terephthaloyl chloride in the presence of an alkaline carbonate.

13. The process of preparing an orange dyestuff of good fastness to light and to washing, which comprises diazotizing 2-naphthalamine-6,8-disulfonic acid monosodium salt, coupling to aniline-omega-sulfonic acid, hydrolyzing the resulting sulfamino-azo dyestuff to give the free amine, rediazotizing, coupling to meta-toluidine, and condensing the resulting amino-disazo dyestuff substantially in the molal ratio 2:1 with terephthaloyl chloride in a weakly alkaline medium.

14. The process of preparing a light brown dyestuff of good fastness to light and to washing which comprises diazotizing sulfanilic acid, coupling to Cleve's acid, rediazotizing, coupling to meta-toluidine and condensing the amino-disazo dyestuff thus obtained substantially in the ratio of 2:1 moles with terephthaloyl chloride in a weakly alkaline medium.

15. As new products, dyestuffs of the following probable general formula:

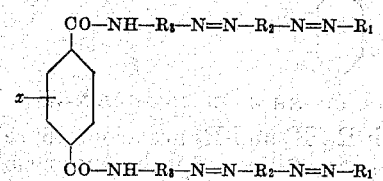

in which $x$ is hydrogen or halogen and $R_1$, $R_2$, $R_3$, $R_4$, $R_5$, and $R_6$ are aromatic residues of the benzene or naphthalene series but in which $R_3$ and $R_6$ are free from auxochromic groups and $R_1$ and $R_4$ may be azo chains of aryl bodies of the benzene or naphthalene series linked together by $-N=N-$ groups.

16. As new products, dyestuffs of the following probable general formula:

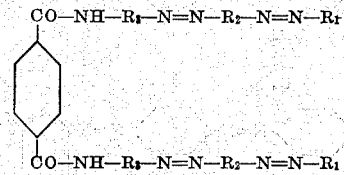

in which $R_1$ is an azo chain of aryl bodies of the benzene or naphthalene series linked together by $-N=N-$ groups and $R_2$ and $R_3$ are aromatic residues of the benzene or naphthalene series containing no OH or $NH_2$ groups.

17. As new products, dyestuffs of the following probable general formula:

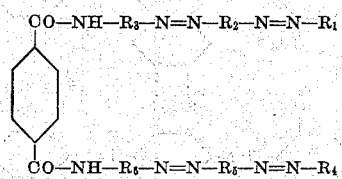

in which $R_1$, $R_2$, $R_3$, $R_4$, $R_5$ and $R_6$ are aromatic residues of the benzene or naphthalene series but in which $R_3$ and $R_6$ are free from OH and $NH_2$ groups and $R_1$ and $R_4$ may be azo chains of aryl bodies of the benzene or naphthalene series linked together by $-N=N-$ groups.

18. As new products, dyestuffs of the following probable general formula:

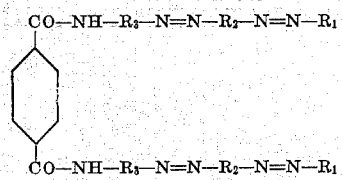

in which $R_1$ $R_2$ and $R_3$ are aromatic residues of the benzene or naphthalene series containing no OH or $NH_2$ groups.

19. As new products, dyestuffs of the following probable general formula:

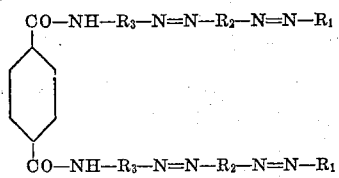

in which $R_1$, $R_2$ and $R_3$ are aromatic residues of the benezene or naphthalene series said dyestuff containing at least two sulfonic groups but no free OH or $NH_2$ groups and dyeing cotton in orange to brown shades, of good fastness to light and to washing.

20. As a new product, a dyestuff comprising a compound having in the form of its free acid the following probable formula:

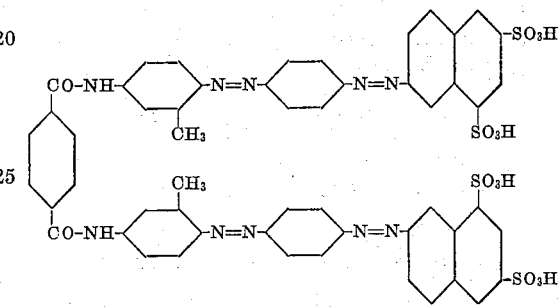

said dyestuff dyeing cotton in light orange shades of good fastness to light and to washing.

21. As a new product, a dyestuff comprising a compound having in the form of its free acid the following probable formula:

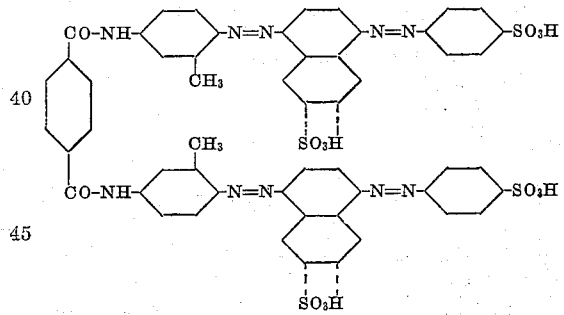

said dyestuff dyeing cotton in light brown shades of good fastness to light and to washing.

In testimony whereof, we have hereunto subscribed our names at Carrollville, Milwaukee County, Wisconsin.

IVAN GUBELMANN.
ARTHUR R. MURPHY.